(12) United States Patent
de Ghellinck

(10) Patent No.: US 11,450,165 B2
(45) Date of Patent: Sep. 20, 2022

(54) BLOCKCHAIN-BASED SYSTEM AND METHOD FOR SECURING TRANSACTIONS AND CONTROLLING ACCESS TO WORKSITES

(71) Applicant: Sebastien de Ghellinck, Skillman, NJ (US)

(72) Inventor: Sebastien de Ghellinck, Skillman, NJ (US)

(*) Notice: Subject to any disclaimer, the term of this patent is extended or adjusted under 35 U.S.C. 154(b) by 186 days.

(21) Appl. No.: 16/919,359

(22) Filed: Jul. 2, 2020

(65) Prior Publication Data

US 2021/0005039 A1 Jan. 7, 2021

Related U.S. Application Data

(60) Provisional application No. 62/943,985, filed on Dec. 5, 2019, provisional application No. 62/870,169, filed on Jul. 3, 2019.

(51) Int. Cl.
*G07C 9/29* (2020.01)
*G07C 9/00* (2020.01)
*G07C 9/27* (2020.01)
*H04L 9/06* (2006.01)
*G07C 9/25* (2020.01)
*H04L 9/00* (2022.01)

(52) U.S. Cl.
CPC ........... *G07C 9/29* (2020.01); *G07C 9/00309* (2013.01); *G07C 9/25* (2020.01); *G07C 9/27* (2020.01); *H04L 9/0643* (2013.01); *H04L 9/50* (2022.05)

(58) Field of Classification Search
CPC ........ G07C 9/29; G07C 9/00309; G07C 9/25; G07C 9/27; G07C 9/257; H04L 9/0643; H04L 9/50; H04L 9/3297; H04L 9/3239
USPC ....................................................... 340/5.61
See application file for complete search history.

(56) References Cited

U.S. PATENT DOCUMENTS

| | | | | |
|---|---|---|---|---|
| 10,387,839 B2* | 8/2019 | Wehrle | ............... | G06Q 10/1053 |
| 10,713,963 B2* | 7/2020 | Darnell | .................... | G09B 7/00 |
| 10,931,672 B1* | 2/2021 | Dequeiroga | ............. | H04L 9/50 |
| 11,263,641 B2* | 3/2022 | Chantz | .................... | G06F 21/64 |
| 2007/0033419 A1* | 2/2007 | Kocher | ............ | G11B 20/00086 |
| | | | | 713/193 |
| 2018/0165781 A1* | 6/2018 | Rodriguez | ......... | G06Q 20/3672 |
| 2018/0218454 A1* | 8/2018 | Simon | ................... | H04L 9/3239 |
| 2019/0164137 A1* | 5/2019 | Vincent | ................. | H04W 12/08 |
| 2019/0180276 A1* | 6/2019 | Lee | ........................ | H04L 9/3247 |
| 2019/0188804 A1* | 6/2019 | Parry | ................. | H04L 63/1425 |
| 2019/0339684 A1* | 11/2019 | Cella | .................... | H04B 17/309 |

(Continued)

*Primary Examiner* — Nam V Nguyen
(74) *Attorney, Agent, or Firm* — Meagher Emanuel Laks Goldberg & Liao, LLP

(57) ABSTRACT

According to various embodiments, a system for controlling the presence of one or more individuals at a worksite is disclosed. The system includes a kiosk device and a database. The kiosk device includes a scanning device configured to receive an optical code representing an individual. The kiosk device further includes a processing system configured to determine whether the identified individual can enter the worksite by comparing professional documentation of the identified individual with safety requirements of the worksite. The database includes professional documentation of potential worksite individuals that the processing system can access to determine whether the identified individual can enter the worksite.

6 Claims, 12 Drawing Sheets

(56) References Cited

U.S. PATENT DOCUMENTS

| | | | | |
|---|---|---|---|---|
| 2020/0174463 A1* | 6/2020 | Cella | ............... | H04L 1/0041 |
| 2020/0193292 A1* | 6/2020 | Weng | ............... | G06N 3/04 |
| 2020/0218940 A1* | 7/2020 | Anglin | ............... | G06N 20/00 |
| 2020/0344132 A1* | 10/2020 | Padmanabhan | ............... | H04L 41/22 |
| 2020/0410791 A1* | 12/2020 | Blackburn | ............... | G07C 1/10 |
| 2021/0064782 A1* | 3/2021 | Takahashi | ............... | G06F 21/64 |

* cited by examiner

BLOCKCHAIN-BASED SYSTEM AND METHOD FOR SECURING TRANSACTIONS AND CONTROLLING ACCESS TO WORKSITES

CROSS-REFERENCE TO RELATED APPLICATIONS

This application claims priority to provisional applications 62/870,169 and 62/943,985, filed Jul. 3, 2019 and Dec. 5, 2019, respectively, which are herein incorporated by reference in their entirety.

FIELD OF THE INVENTION

The present invention relates generally to blockchain technology and, more particularly, to a system and method for securing issuances and records of professional documents as well as controlling access to worksites.

BACKGROUND OF THE INVENTION

The US Bureau of Labor Statistics reported 5,147 occupational fatalities for 2017 and many more non-fatal occupational accidents. Five high-risk industries are proportionally large contributors to this dramatic problem, accounting for 2,482 occupational fatalities in 2017: Construction—971; Transportation—882; Manufacturing—303; Landscaping—214; and Mining—112. This translates to 6.80 worker deaths per calendar day across the US in these five industries. The 2019 annual Liberty Mutual Workplace Safety Index estimates that "workplace injuries cost US Companies over $1 billion per week" in medical and lost-wage payments. Again, three high-risk industries contribute a proportionally larger amount of $420.39 million to these total estimated weekly costs: Construction—$189.81/week million; Manufacturing—$146.54/week million; and Transportation—$84.04/week million.

The Occupational Safety and Health Administration (OSHA) was established in 1970, to "assure safe and healthy working conditions for working men and women by setting and enforcing standards and by providing training, outreach, education and assistance". OSHA's mission statement determines that worker training is a critical enabler of its workplace safety goals. Common sense and studies determine that professional training makes people more competent at their jobs, more considerate of risks, and helps reduce fatal and non-fatal accidents. In most high-risk industries, the US Department of Labor (DOL), Trade Industries, Companies, and other organizations setup mandatory training for workers. Federal and State OSHA agencies, as well as authorized Local Government agencies may execute inspections on workplaces across the US. These inspections may include the examination of individual workers and employers' compliance with mandatory training rules and legislation. OSHA regularly reports of findings and violations on its official social media accounts. Further, most employers who send individual workers to high-risk worksites or to execute high-risk activities will propose a safety orientation. This orientation can be delivered according to different methods: detailed safety reminders, video, in-person conversation, assessment, administrative checks, and more.

In the US, several organizations, networks, companies, and individuals can become Approved Training Providers to deliver online, virtual, and in-person training classes, awareness programs, professional courses, and educational services to students working or preparing to work in high-risk industries. Training providers may also be officially authorized to issue proof of training, professional licenses, or certifications of completion to students who successfully complete the training programs.

However, there is currently no central registry system, nor set format or content standards in the US for documentation attesting valid proof of professional training, professional licenses, or certifications of completion. Formats range from plastic wallet-sized cards to online or self-printed documents. These issued documents also lack security features such as magnet stripe, chip, hologram, or other methods that make these official documents harder to fraudulently (photo) copy, duplicate, alter, forge, or otherwise imitate.

As a result of the void in prescribed format, content and security standards and guidelines, fraud is an extremely significant problem and undermines Government and Employer efforts. On a very regular basis, individuals and organized groups are apprehended and punished by Law Enforcement because they have set up illegal operations to design, produce, and distribute or sell fraudulent proof of professional training, professional licenses, or certifications of completion. The prejudice caused by these illegal operations is to send individuals on high-risk jobs who do not have the required knowledge of risks and mandatory training to perform their professional responsibilities safely for themselves or for their co-workers, resulting in a higher rate of accidents and on-the-job fatalities.

As such, there is a need for a system and method to securely issue proof of professional training, professional licenses, and/or certifications of completion (i.e., "professional documentation") that will be easy to implement, secure, and prevent fraud. Further, it would be useful to employers to instantly gain knowledge of individuals who are entering or exiting the worksite and to know about each individual's professional training, worksite orientation, certifications, skills or experience. Controlling these elements will allow the employer to control the level of risk on their worksite and potentially decrease the rate of accidents.

SUMMARY OF THE INVENTION

According to various embodiments, a kiosk device for controlling the presence of one or more individuals at a worksite is disclosed. The kiosk device includes an identifying mechanism configured to receive identifying information representing an individual. The kiosk device further includes a processing system configured to determine whether the identified individual can enter the worksite by accessing a database to compare professional documentation of the identified individual with safety requirements of the worksite.

According to various embodiments, a system for controlling the presence of one or more individuals at a worksite is disclosed. The system includes a kiosk device and a database. The kiosk device includes a scanning device configured to receive an optical code representing an individual. The kiosk device further includes a processing system configured to determine whether the identified individual can enter the worksite by comparing professional documentation of the identified individual with safety requirements of the worksite. The database includes professional documentation of potential worksite individuals that the processing system can access to determine whether the identified individual can enter the worksite.

According to various embodiments, a blockchain-based system for securing worksite training transactions is disclosed. The system includes one or more processors configured to access a unique student profile of a student and access a unique trainer profile of a trainer. The processors are further configured to initiate an electronic delivery of a professional documentation via the trainer to send to the student. The professional documentation includes a unique record of information to identify the student. The processors are also configured to accept the electronic delivery of the professional documentation via the student. Each electronic delivery of professional documentation forms a record as part of a registry of records, each record containing a cryptographic hash of the previous record such that one record cannot be altered retroactively without alteration of subsequent records.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Figure 1:
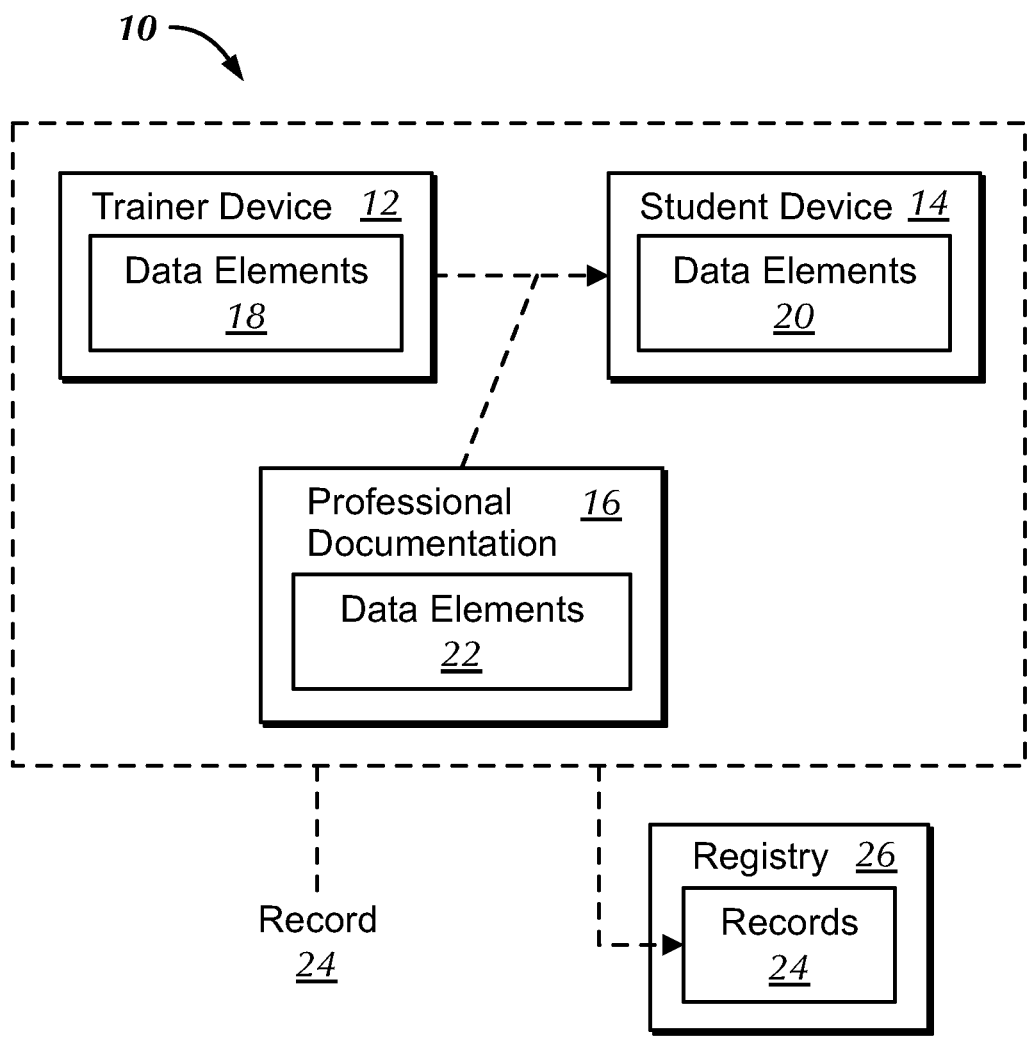
FIG. 1 depicts a block diagram of a system overview of a training transaction according to an embodiment of the present invention.
Figure 2:
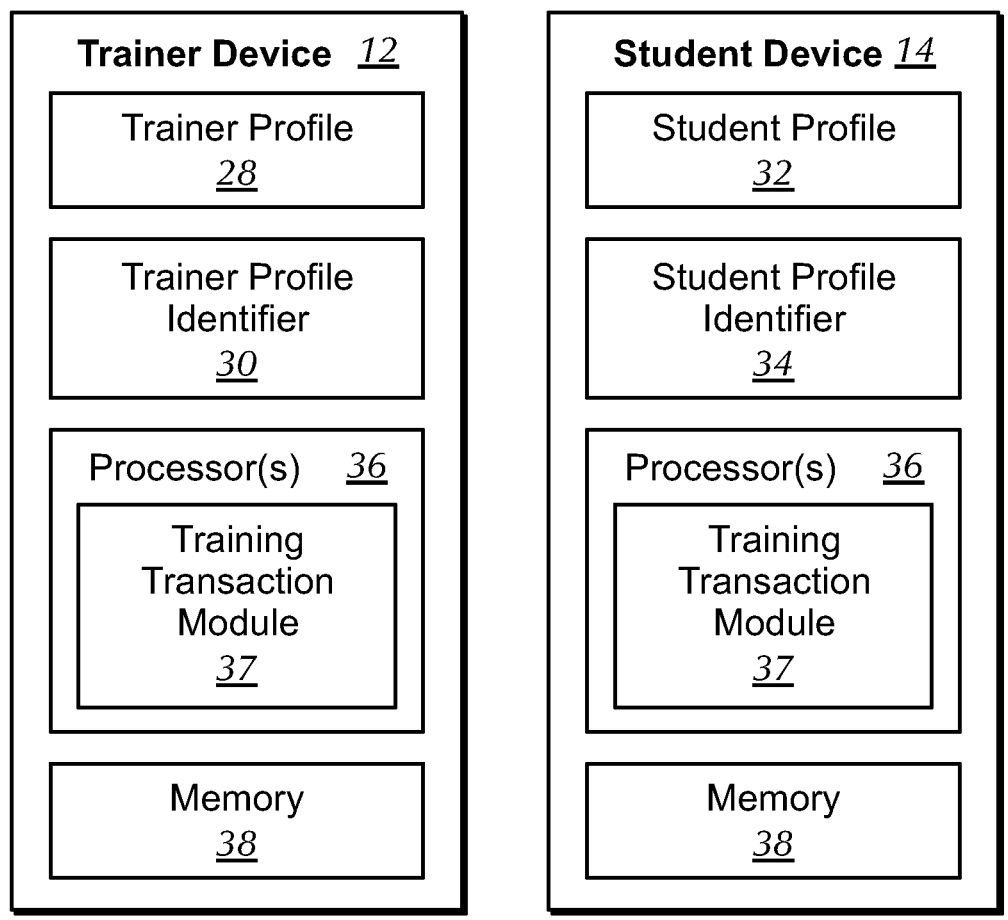
FIG. 2 depicts a block diagram of a trainer device and student device according to an embodiment of the present invention.

Generally disclosed herein are embodiments for a system and method to secure training transaction using blockchain technology. The system and method include accessing a unique student profile for a student and accessing a unique trainer profile for a trainer. The system and method further include initiating an electronic delivery of a professional documentation via the trainer to send to the student, where the professional documentation includes a unique record of information to identify the student. The system and method also include accepting the electronic delivery of the professional documentation via the student.

All the data associated with the issuance of one Professional Documentation (e.g. proof of professional training, professional licenses, and/or certifications of completion) from a Trainer to a Student is considered as a transactional unit ("Training Transaction" 10), where the Trainer 12 is the issuer, the Student 14 is the receiver, and the Professional Documentation 16 is the Object of the transaction between both parties. In this Training Transaction 10, the Trainer 12 is associated with personally identifiable data elements 18 such as but not limited to: first name, last name, unique trainer approval identification number, physical address, and/or telephone number. The Student 14 is associated with personally identifiable data elements 20 such as but not limited to: first name, last name, physical address, and/or telephone number. The Professional Documentation 16 is associated with unique data elements 22 such as but not limited to: type of training, date and time of completion, associated fees, delivery date, expiration date, and/or date of birth. Because each Training Transaction 10 can be considered as a unique record ("Record") 24 and contains inherent socio-economic value, it is recognized that the above associated Trainer data elements 18, Student data elements 20, and Professional Documentation data elements 22 included in the Record 24 are sensitive in their nature. The integrity of the Record 24 and all its associated data elements should be protected against computer hacking and fraudulent alterations.

Each Record 24 with its associated data elements and others associated to any such Training Transaction 10 can be recorded, registered, maintained, structured, or queried in a modern computer database that would act as a growing list of records or "Registry" 26 of reference for these Training Transactions 10. The Registry 26 may be cloud-based or a local database. The Registry 26 may include a server for receiving and storing the Training Transactions 10. In such a Registry 26, the integrity of Training Transactions 10, its Records 24, and its associated data elements 18, 20, 22 should be protected with the highest available level of digital or computer security. Using a blockchain-based implementation will deliver the desired level of security. A blockchain is a growing list of records, called 'Blocks', which are linked using cryptography. Each block contains a cryptographic hash of the previous block, a timestamp, and transaction data. Given the specifications of blockchain, using this technology will deliver an exceptionally secure Registry 26 as described above. By design, a blockchain is resistant to modification of the data. It is an open, distributed ledger that can record transactions between two parties efficiently and in a verifiable and permanent way. Once recorded, the data in any given block cannot be altered retroactively without alteration of all subsequent blocks, which requires consensus of the network majority. A blockchain-based Registry 26 of growing Training Transaction Records 24 can mitigate some or all the omissions and prevent the socio-economic prejudice described earlier.

A Registry 26 of digital Records of Training Transactions 24 protected with the highest available level of security technology available to authorized agencies will act as fraud prevention: Professional Documentation 16 presented by individuals, workers, or employers at inspections, employment processes, or other circumstances will be supported or backed up by a tamper-proof digital Record ("Block") 24 from the Registry 26. Should fraudulent documentation be presented by individuals, workers or employers at inspections, employment processes, or other circumstances, the absence of a valid Block 24 from the Registry 26 will indicate the fraud. Additional benefits of using a blockchain-based Registry 26 include the ability to setup specific user protocols, conditions, and rules for all users of the data: Trainers 12, Students 14, Government, Public, or Private Organizations. Another additional benefit is the ability to set up an open, decentralization data model that does not necessarily require one central administrator of the Registry 26. This reinforces the ability to arrange public access to the data and/or access to the data by authorized government inspectors or fraud-preventive agents.

Presently, any certified Trainer may issue Professional Documentation to a Student without registering the Transaction data in any type of Central, Regional, or National computer database. Some Trainers keep their own computer database, some Trainers use existing dedicated computer solutions, some Trainers use computer spreadsheets, and some Trainers use paper records to keep track of relevant data. These disparate documents for which no standard exists are the only available items that can be used during any audit or assessment, making enforcement even more difficult and time-consuming.

As such, the embodiments disclosed herein aim to use connected computers and mobile devices as well as blockchain technology to create a secure Registry 26 of Training Transactions 10. Any certified Trainer 12 will be able to download or use a dedicated computer or mobile device application to register and maintain a Trainer profile 28. A Trainer profile 28 may include information about professional training, professional licenses, or certifications they are authorized to provide to Students 14. Each registered Trainer 12 will be assigned a unique Trainer profile identifier 30. This information provided by the Trainer 12 may be verified against public and private records to avoid uncertified Trainers registering a fraudulent profile. The Trainer profile 28 may be considered as a unique training account, where the Trainer 12 can transfer and assign proof of training, professional licenses, or certifications to a registered Student account. Any Student 14 will be able to download or use a dedicated computer or mobile device application to register and maintain a personal Student profile 32. A Student profile 32 may include information about professional training, professional licenses, or certifications held by the Student 14. This information provided by the Student 14 may be verified against public and private records to verify identity. Each registered Student 14 will be assigned a unique Student profile identifier 34. The Student profile 32 may be considered as a unique training account that can receive and be credited with proof of training, professional licenses, or certifications delivered by a registered Trainer.

The dedicated computer or mobile device for the Trainer and the Student may be implemented in a variety of configurations including general computing devices such as but not limited to desktop computers, laptop computers, tablets, network appliances, and the like or mobile devices such as but not limited to mobile phones, smart phones, smart watches, or tablet computers. The dedicated computer or mobile device includes one or more processors 36 for performing specific functions related to the respective trainer or student application and memory 38 for storing those functions. For instance, the processors 38 may include a training transaction module 37 for performing the training transactions 10 described herein.

Figure 3:
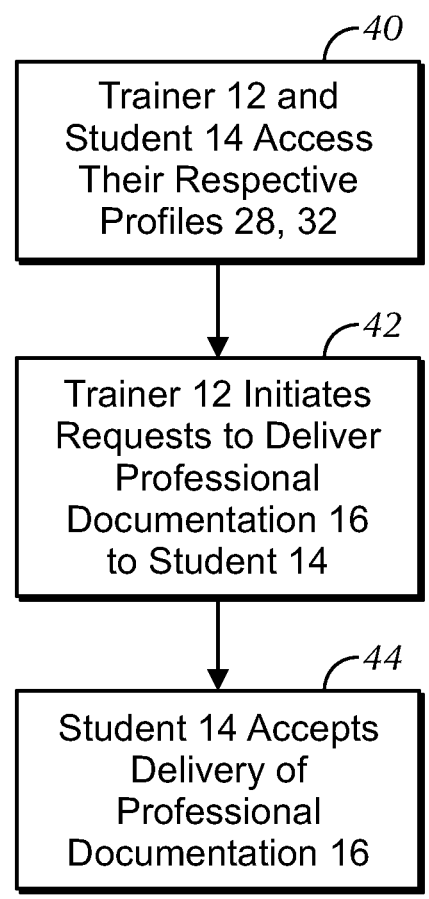
FIG. 3 depicts a flow chart of a process for a training transaction according to an embodiment of the present invention.

FIG. 3 describes the proposed Training Transaction 10 process, secured with blockchain. When the Student 14 successfully completes a professional training, professional license, or certification with the Trainer 12, both Trainer 12 and Student 14 can proceed to a transaction 10 where Trainer 12 will transfer a Professional Documentation 16 from the Trainer profile 28 to the Student profile 32. At initial step 40, both Trainer 12 and Student 14 will use their respective dedicated computer or mobile device application to access their respective unique profiles 28, 32 or create a profile at that time. The Trainer 12 may be able to access the Student profile 32 to verify identity and other information provided by the Student 14.

At the next step 42, the dedicated computer or mobile device application will allow the Trainer 12 to initiate a request to electronically deliver the Professional Documentation 16 to the Student 14. This request will generate a unique record of information 24 containing unique data elements 18, 20, 22 such as but not limited to: first and last name of Trainer, Trainer identifier, Trainer location, first and last name of Student, physical address of Student, telephone number of Student, type and name of training, date and time of completion, associated fees, delivery date and time and/or expiration date. This unique record of information ("Record of Training Transaction") 24 will be electronically delivered to the Student profile 32. All data elements 18, 20, 22 associated with Record of Training Transaction 24 will be visually represented inside the Student profile 32 on the dedicated computer or mobile device application. The visual design may look like a virtual certification of completion or professional license including associated data such as but not limited to: first and last name of Trainer, Trainer identifier, Trainer location, first and last name of Student, physical address of Student, telephone number of Student, type and name of training, date and time of completion, associated fees, delivery date, and/or expiration date. Each Training Transaction Record 24 will also be given a unique identifier that may be associated with an encryption key or "hash". This step 42 may also include processing a payment for the transaction. For instance, the Student 14 could pay the Trainer 12 via a payment option in the Student Profile 32, such as stored credit card information, as a nonlimiting example.

The last step 44 will be the Student 14 accepting the delivery of Professional Documentation 16 via their dedicated computer or mobile device application. When accepted, the Professional Documentation 16 will be permanently placed into a virtual wallet associated with the Student profile 32 on their computer or mobile device, be permanently added to the electronic records included in the Trainer profile 28, and be permanently placed in the Blockchain ledger Registry 26 of all Training Transactions.

Via their dedicated computer or mobile device application, the Student 14 will be able to permanently access the secure and verified Professional Documentation 16 in the virtual wallet and in the future for any professional reasons, for instance, to show to an employer, inspector, or other authorized agent. Via their dedicated computer or mobile device application, the Trainer 12 will be able to access a permanent log of training delivered to any Student 14 for any professional reasons, for instance, for business reports, or to show to an inspector or other authorized agent. Any Training Transaction Records 24 processed via the dedicated computer or mobile device applications will be securely kept on a growing secure or encrypted Registry of data ("Registry") 26. This Registry 26 may be publicly available to employers, inspectors, or authorized agents who need to verify a Professional Documentation 16 or any data elements 22 associated with the Professional Documentation.

Blockchain-based technology is used to secure the Training Transaction Record 24 as well as secure the entire Registry 26 of all Training Transactions. At the instant the Trainer 12 initiates or requests Professional Documentation 16 be delivered to a Student 14 via the dedicated computer or mobile device application, the request will generate a unique record of information (Training Transaction Record) 24 containing unique data elements 18, 20, 22 such as but not limited to: first and last name of Trainer, Trainer identifier, Trainer location, first and last name of Student, physical address of Student, telephone number of Student, type and name of training, date and time of completion, associated fees, delivery date and/or expiration date. This unique record of information 24 with all its associated data elements 18, 20, 22 will be converted or packaged into a block of data. A unique identifier such as a digital encryption key or hash will be associated with this block. Only the Student 14 associated with the Training Transaction Record 24 has the key to reverse the encryption and access the data elements 18, 20, 22.

At the instant the Student 14 accepts the block, the block will be checked by network nodes to validate the transaction. These nodes could be centralized/private or decentralized/public and will make sure that all data elements 18, 20, 22 are valid (e.g. valid Trainer identifier, valid date of delivery, valid location of Trainer). Each validated record 24 or block will be added to the secure or encrypted Registry 26 and on the blockchain ledger. The hash codes connect the blocks together in a specific order. One of the benefits of blockchain is that it is tamperproof: each block that is added onto the chain carries a hard, cryptographic reference to the previous block. At the instant the block was accepted by the Student 14 and validated in the network, the Training Transaction Record 24 will be added to this blockchain ledger or Registry 26 of growing Training Transactions between Trainers 12 and Students 14 in a permanent, secure and unalterable manner, and the Professional Documentation 16 will be permanently delivered and accessible to the Student 14 and Trainer 12 via the dedicated computer or mobile device application.

Other proposals may exist to secure data registries with blockchain technology but these focus on post-transaction verification. For instance, in education, an individual can request an educational institution that delivered a diploma or degree in the past to securely attest on this document by associating it with a block. By contrast, embodiments of the disclosed system and method issues the block at the instant when a Training Transaction 10 is closed between a Trainer 12 and a Student 14. This scope is driven by the fact that most Professional Documentation 16 has an expiration date and needs to be renewed. This "constant re-training" obligation that exists in most high-risk industries causes a faster cycle of issuance.

Further generally disclosed herein are embodiments for a system and method to control the presence of one or more individuals at a worksite. The system and method include an identifying mechanism configured to receive identifying information that represents an individual and a processing system configured to determine whether the identified individual can enter the worksite by comparing professional documentation of the identified individual with safety requirements of the worksite and government regulations.

The disclosed embodiments may include three parts: a database of professional information, a device to keep track and control presence on a worksite, and a process to link the first two parts.

The database of professional information may include the blockchain based Registry 26 described above, or may be alternative type of database. The professional information includes and is not limited to: training, education, professional skills, professional experience, certifications, licenses, acknowledgements, and/or union memberships ("professional documentation"). Generally, this information is valuable to provide a professional status and/or indicator of professional competencies for an individual. One may assume that the more legitimate documentation the individual can provide, the better the individual's professional mastery. In some professions and professional endeavors, some of these certifications, acknowledgements, licenses and other proof of professional skills and aptitude is mandated and/or required by Federal and/or State Law. Individuals who do not possess mandated and/or required professional documentation are considered out of compliance, subject to liability or penalties. Employers hiring out of compliance individuals may also be subject to liability or penalties, as the presence of these individuals usually increases the risk of accidents, injury and fatalities on-site. On its publications and public notifications OSHA is frequently reporting observed lapses, citations and violations.

The current processes for collecting professional documentation from individual workers by employers are usually slow, manual, incomplete, unstructured, and/or lacking updates. By contrast, the disclosed embodiments can use software and technology available on computers and smartphones to register a professional profile of an individual that will include the systematic recording of professional documentation.

The disclosed embodiments further include a device (referred to herein as a "Safety Kiosk" or "Kiosk Device") to keep track and control presence of individuals on a worksite. The Safety Kiosk can be installed on a worksite and allow individuals to register their arrival on, presence, and departure from the same worksite. The Safety Kiosk may also read, interpret, and process training records, such as the blockchain-based records 24 described earlier. The Safety Kiosk may automatically determine the professional training and certifications available for the individual who scans their device.

Figure 5:
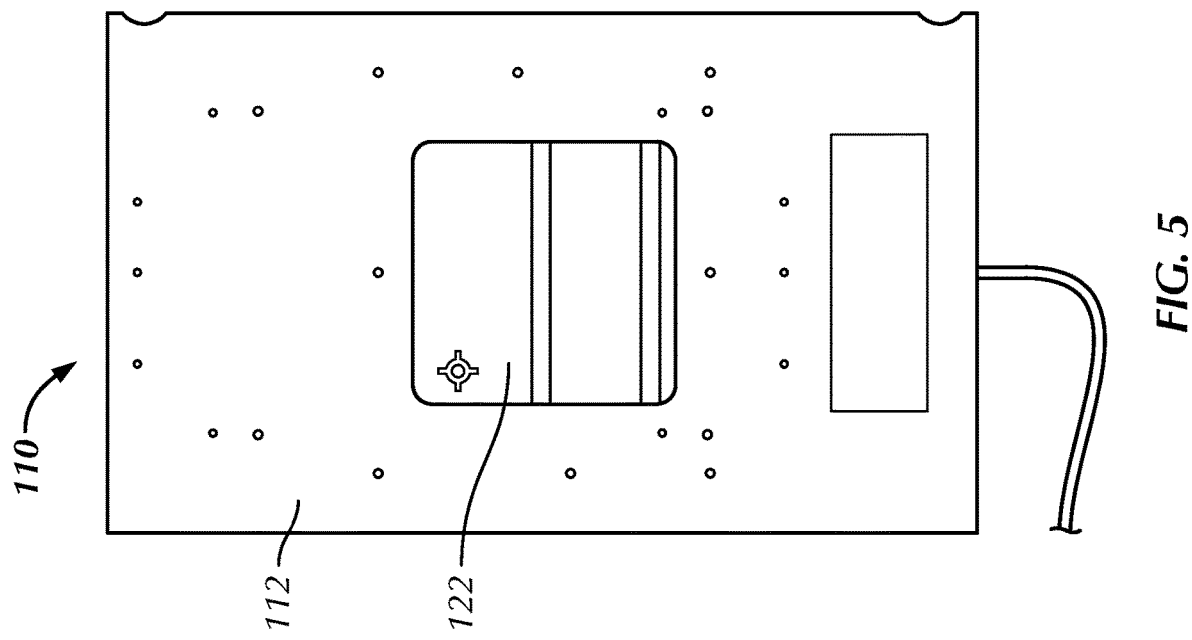
FIG. 5 depicts a diagram of the back of the kiosk device according to an embodiment of the present invention.
Figure 4:
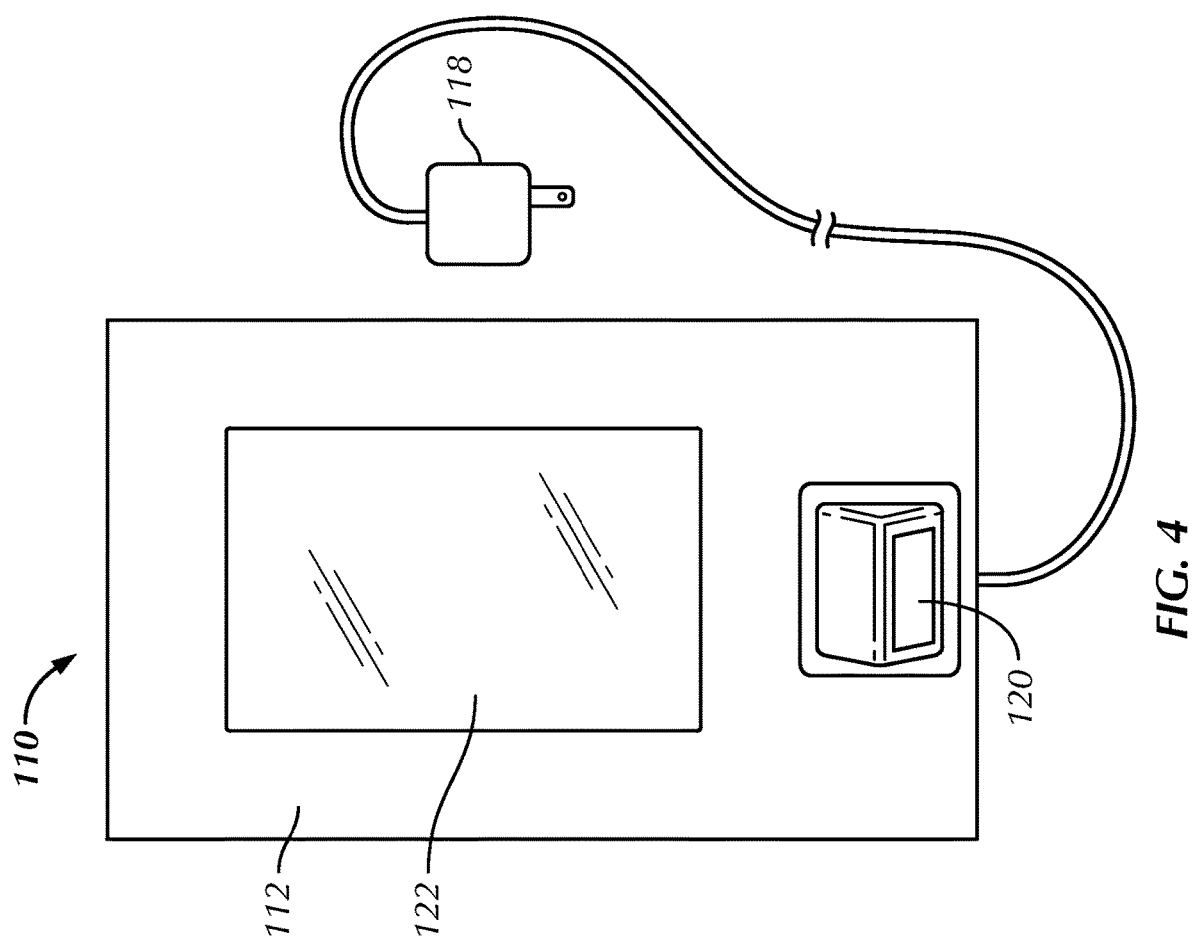
FIG. 4 depicts a diagram of the front of a kiosk device according to an embodiment of the present invention.
Figure 6:
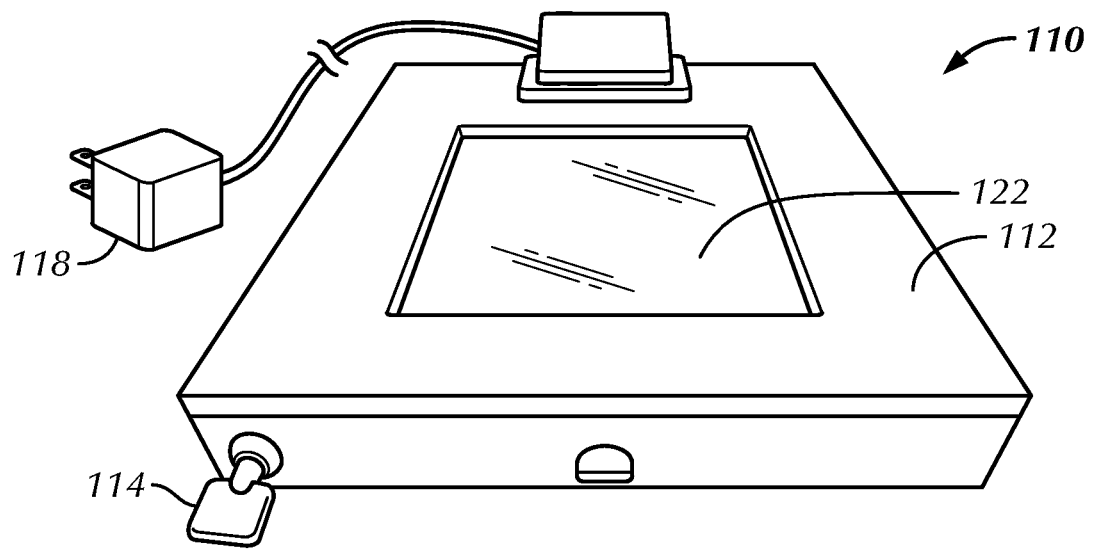
FIG. 6 depicts a diagram of the top of the kiosk device according to an embodiment of the present invention.
Figure 7:
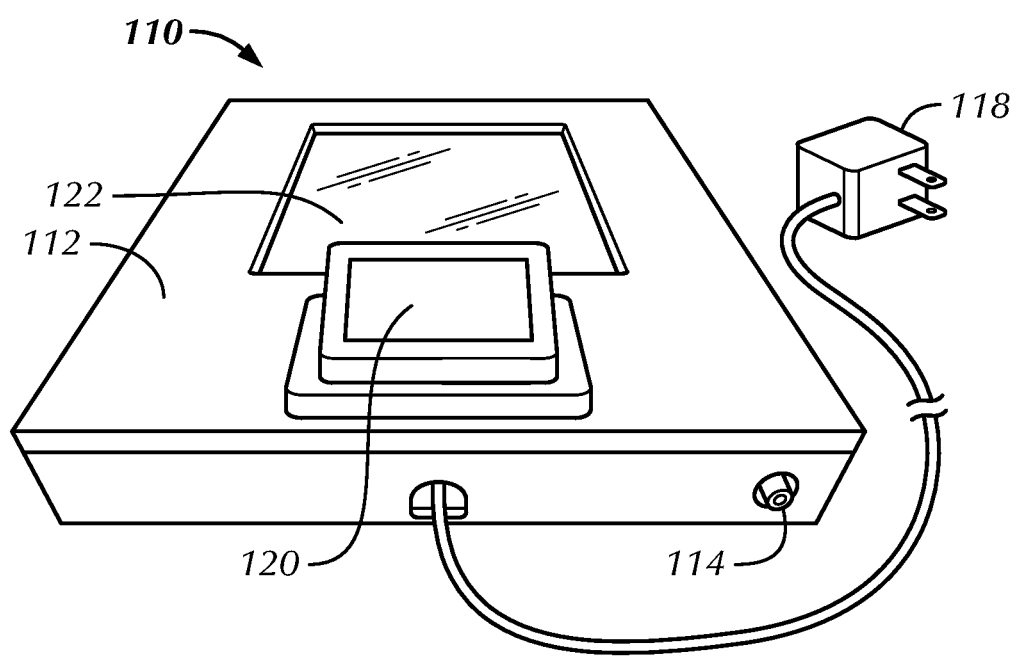
FIG. 7 depicts a diagram of the bottom of the kiosk device according to an embodiment of the present invention.
Figure 8:
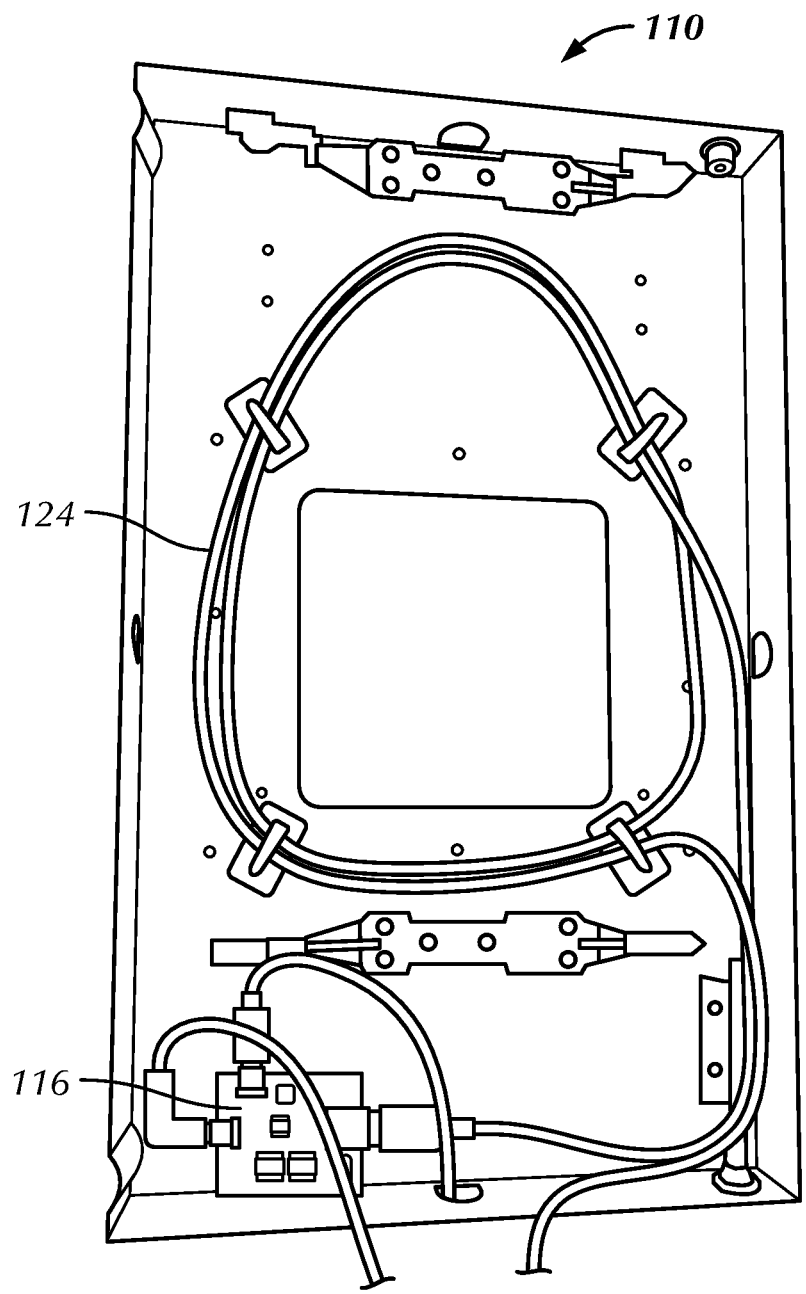
FIG. 8 depicts a diagram of the back panel internally of the kiosk device according to an embodiment of the present invention.
Figure 9:
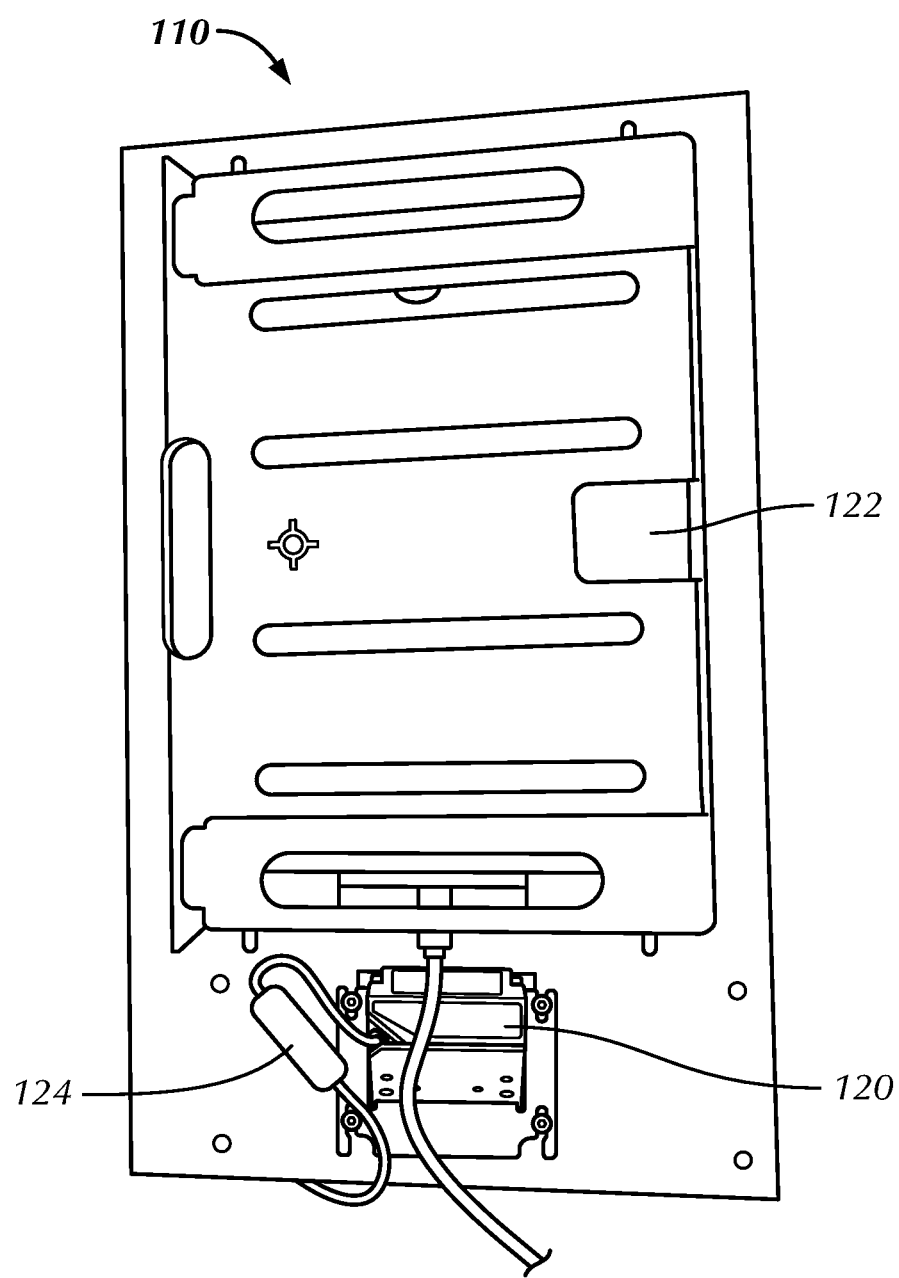
FIG. 9 depicts a diagram of the front panel internally of the kiosk device according to an embodiment of the present invention.
Figure 10:
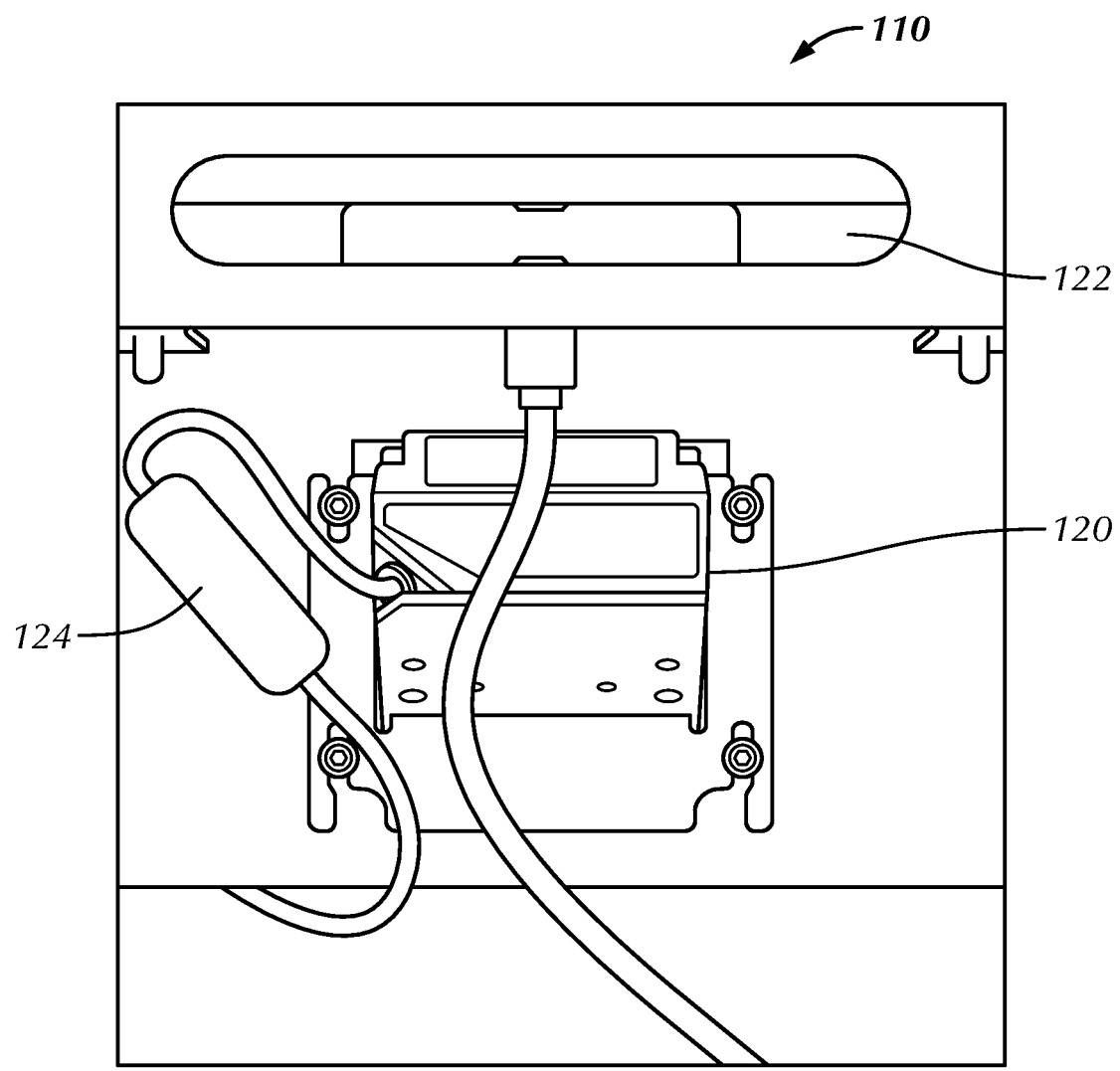
FIG. 10 depicts a close-up of a scanner of the kiosk device according to an embodiment of the present invention.
Figure 11:
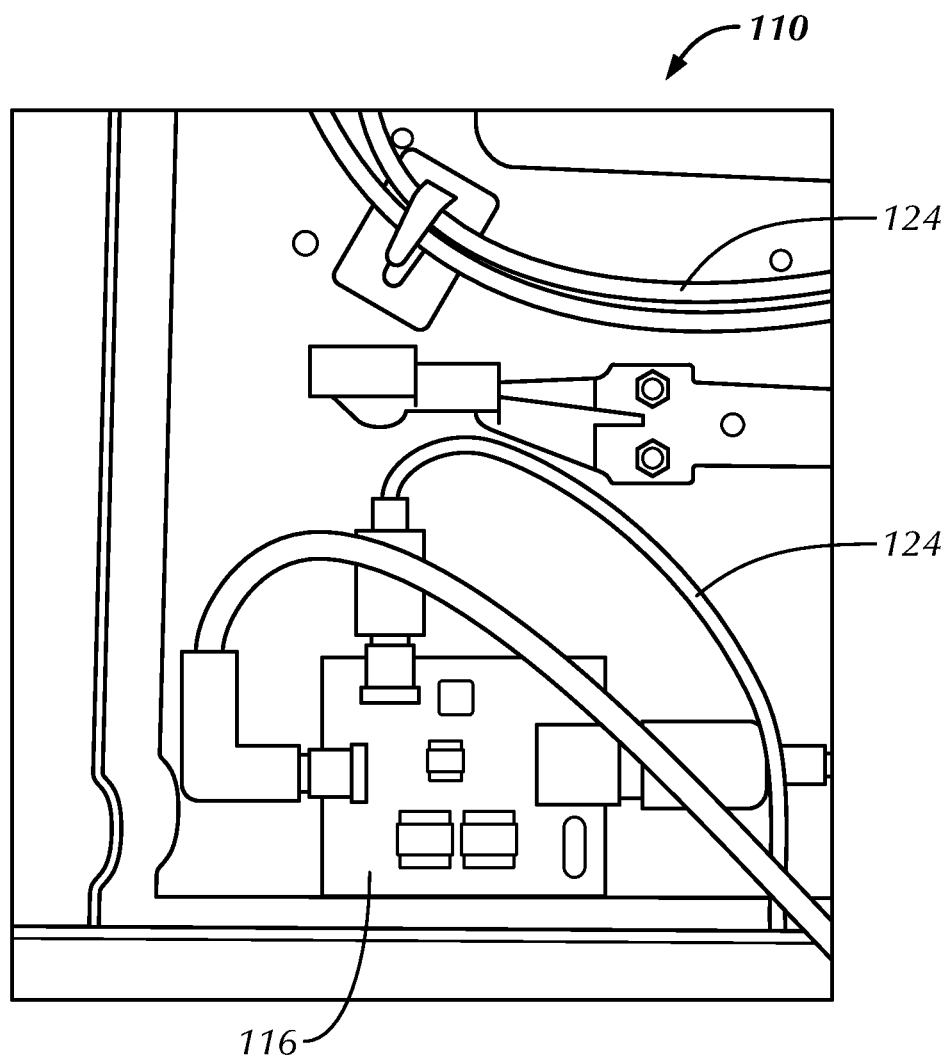
FIG. 11 depicts a close-up of an internal circuit board of the kiosk device according to an embodiment of the present invention.
Figure 12:
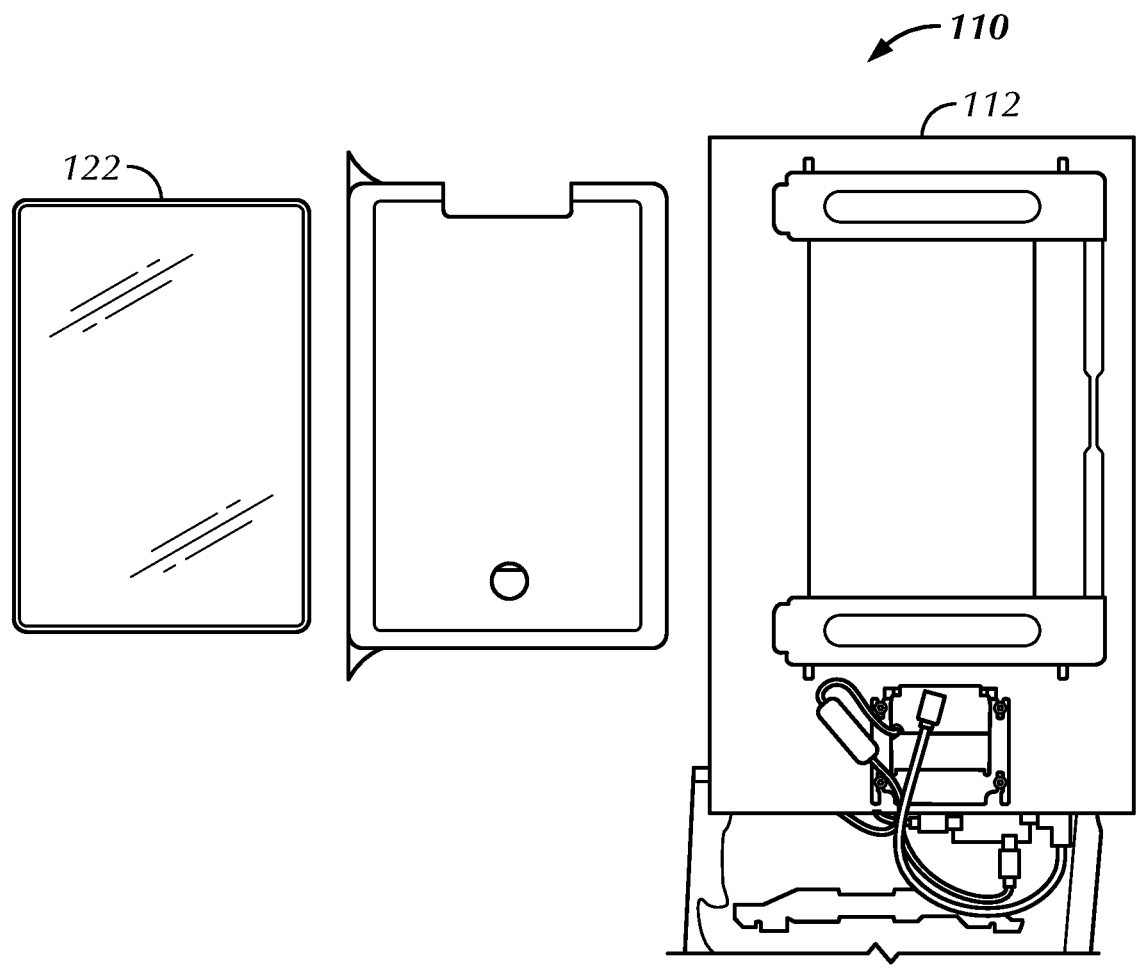
FIG. 12 depicts computer tablet integration with an external enclosure of the kiosk device according to an embodiment of the present invention.

FIGS. 4-12 depict an embodiment of the Safety Kiosk device 110. FIG. 4 depicts the front of the external enclosure along with tablet computer, scanner, and electric charger integration. FIG. 5 depicts the back of the external enclosure. FIG. 6 depicts the top of the external enclosure with a locking pin on the left side that can only be opened with a security key. FIG. 7 depicts the bottom of the external enclosure with a locking pin on the right side that can only be opened with a key. The scanner and electric charger are also included in this figure. FIG. 8 depicts the back panel of the internal enclosure. The circuit board, electric wiring, and internal mechanism of the locking pins are included. The back panel may be equipped with additional safety sensors such as but not limited to: air quality detection, smoke and fire detection, noise sensors, and CO2 sensors. FIG. 9 depicts a front panel of the internal enclosure. Brackets are included to keep the table computer and/or scanner in place. The frontal panel may be equipped with additional light and sound emitting components to alert individuals on site of unsafe or dangerous conditions. FIG. 10 depicts a close-up of the scanner integrated with the external enclosure. FIG. 11 depicts a close-up of the internal circuit board. FIG. 12 depicts computer tablet integration with the external enclosure.

The kiosk device 110 includes an enclosure 112 or external shell to protect the fragile internal parts from damage or manipulation. This enclosure 112 can be made from metal, plastic, synthetic resin, polymer, epoxy, or polyester, as nonlimiting examples. To resist low or high temperatures, moisture, water, or humidity, the enclosure 112 may be coated, processed, or be made weatherproof. The enclosure 112 can also be any shape, though a rectangular shape is preferred for easier computer tablet integration. The enclosure 112 includes an external locking system or mechanism 114 to protect the kiosk device 110 from being opened, manipulated, or tampered with by unauthorized individuals. The external locking system 114 can be a mechanical key or an electronic key fob, as nonlimiting examples.

The kiosk device 110 further includes an internal circuit board 116 inside the enclosure 112 to regulate electric power, manage battery functions, connect several electrical components, connect to a network or the Internet, optimize digital data flow and generally, optimize the electrical parts and components of the Safety Kiosk device 110. The kiosk device 110 also includes an electric charger 118 connected to the internal circuit board 116 that can be plugged into any standard 110V or 220V outlet and convert it to a desirable electric output for the operation of the Safety Kiosk device 110.

Embedded in the enclosure 112 is an internal scanner 120 capable of reading and decoding 1 and/or 2 dimensional barcodes, Quick Response codes (QR codes), matrix codes, and other optical codes. This scanner 120 may be replaced by another identifying mechanism such as and not limited to: camera, face recognition, finger print reader, iris reader, magstripe card reader, chipcard reader, RFID reader, or NFC reader. Also embedded in the enclosure 112 is an internal table computer 122 capable of running software, displaying user interfaces, and interacting with users via one or processors and memory. The tablet 122 may have touch-screen capabilities, or an additional input component may be embedded in the enclosure 112 such as a keyboard or keypad.

The kiosk device 110 further includes a subscriber identity module card or SIM card 126 as part of the tablet 122 inside the enclosure 112 that connects the Safety Kiosk 110 directly to a mobile or cellphone network, enabling the device to access, send, or receive data to and from a data network or the Internet. Internal electric wiring 124 connects and powers the scanner 120 and other electrical components safely as well as ensuring stable and uninterrupted operation of the Safety Kiosk 110.

The kiosk device 110 may further include an internal camera (not shown) to record any surroundings, record or photograph faces of the Safety Kiosk users, and/or monitor security. Other sensors (not shown), such as air quality sensors, smoke and/or fire detectors, CO2 detectors, chemical detectors, environment and body temperature sensors, movement sensors, light sensors, noise sensors, and/or other sensors that can detect safe and unsafe conditions on a worksite may be included as well. Further, light and sound emitting components (not shown) such as high visibility lights, LEDs, panic buttons, alarm buttons, or other lights as well as one or more sound-making devices or sirens may be integrated with the Safety Kiosk 110 to alarm individuals working at a worksite of unsafe or dangerous conditions such as but not limited to smoke, fire, and/or dangerous chemicals.

The Safety Kiosk 110 may be used to scan other barcodes, QR codes or other optical codes related to safety and operations of a worksite. This may include but is not limited to: scan codes placed on tools, equipment, machinery, or other hardware to create an association between a worker and a particular hardware to know "who is using what hardware". This may prohibit or prevent workers without professional licenses, approvals, or relevant training to use or access certain hardware they may not be approved to use. Other optical codes placed on the worksite may be associated with the Safety Kiosk 110 to create zones or areas on a large worksite.

Figure 13:
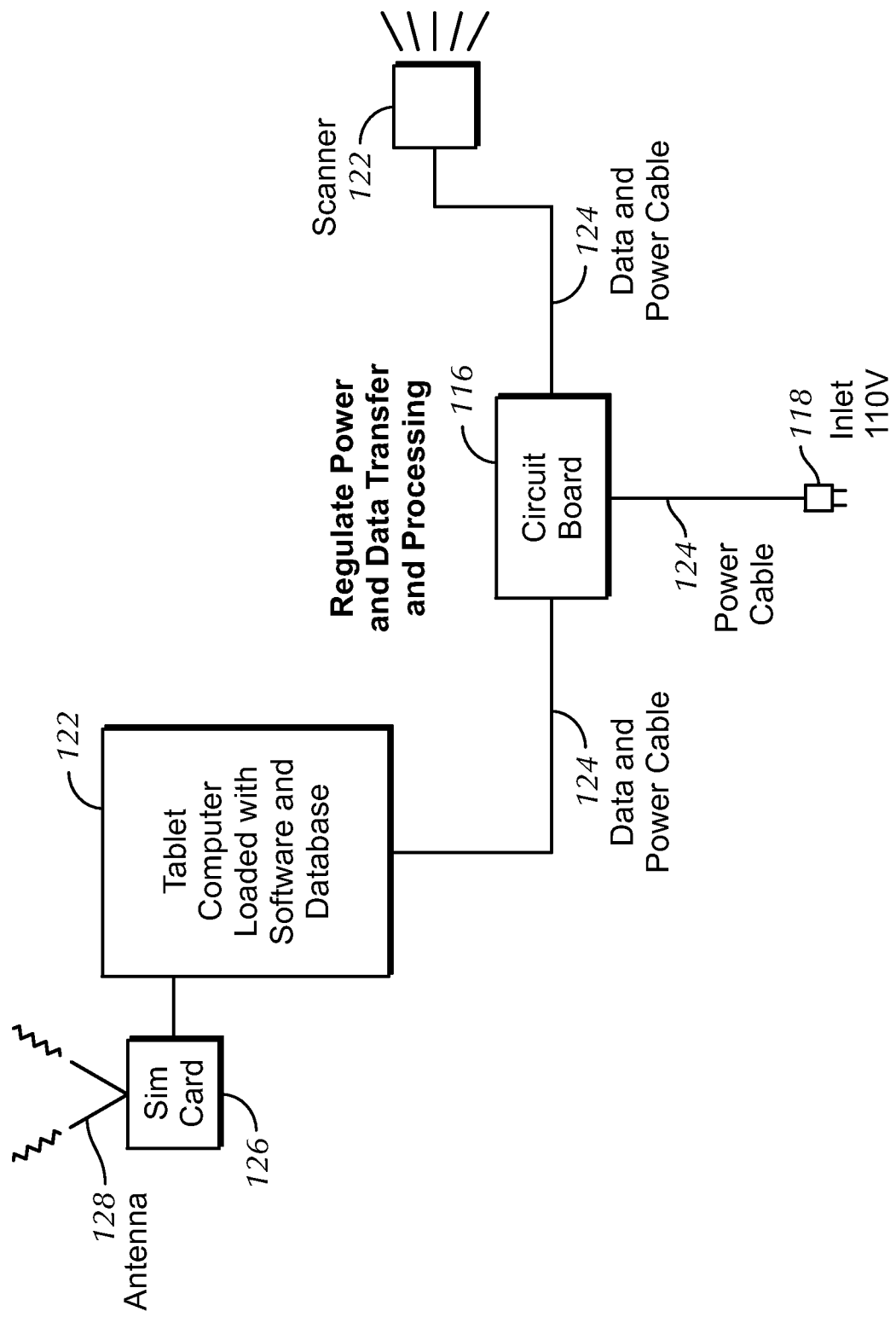
FIG. 13 depicts a diagram of the electronic components of the kiosk device according to an embodiment of the present invention.

FIG. 13 depicts a diagram of an embodiment of the electronic components. Each element is connected via a data and/or power cable 124. The scanner 120 is connected to the circuit board 116, which regulates power and data transferring and processing. The circuit board 116 is connected to an electric charger 118. The circuit board 116 is further connected to the tablet computer 122, which include software and a database for recognizing which individuals are allowed on a worksite. The tablet 122 further include a SIM card 126 and antenna 128 for connecting to a wireless network, such as a cellular network.

Figure 14:
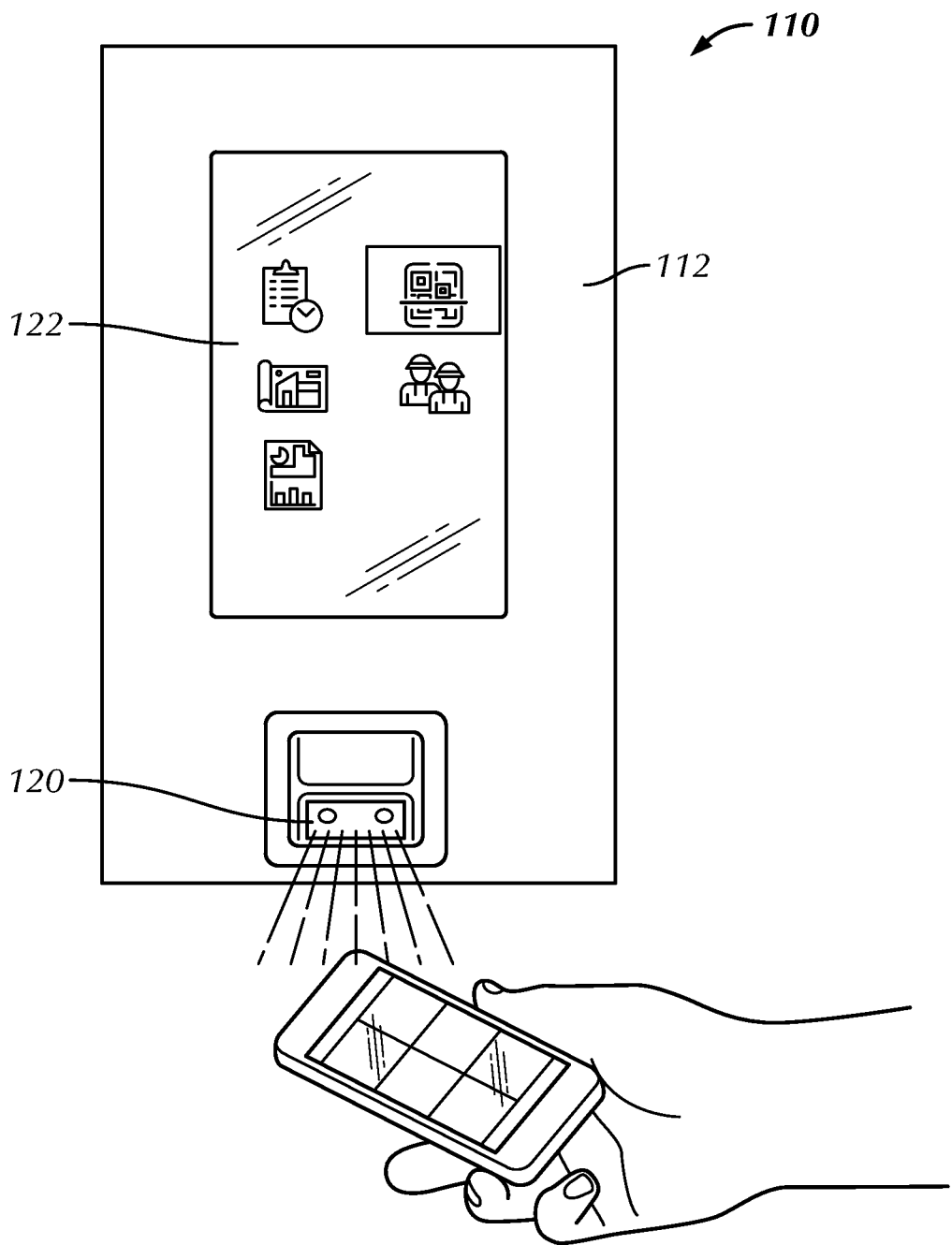
FIG. 14 depicts a diagram of the kiosk device being used to scan a mobile device according to an embodiment of the present invention.

FIG. 14 depicts the Safety Kiosk device 110 being used to scan a QR code displayed on a mobile device to register arrival, presence, and/or departure of an individual. Systematically registering and recording Professional Documentation 16 of an individual (such as the Student 14 described earlier) into an electronic database allows employers to know the professional status, aptitude, and overall ability of the individual to perform activities safely and efficiently without causing unreasonable risk or danger to him/herself or co-workers. The Safety Kiosk may also read, interpret, and process training records, such as the blockchain-based records 24 described earlier. The Safety Kiosk may automatically determine the professional training and certifications available for the individual who scans their device.

The Safety Kiosk 110 installed on a worksite allows individuals to quickly and efficiently register their arrival, presence, and departure to and from the same worksite. To register with the device 110, they can use several methods. These methods include scanning a card with QR code or scanning a smartphone capable of displaying a QR code via the scanner 120. Alternatively, the individual can use the tablet computer 122 integrated with the Safety Kiosk 110 to indicate arrival or departure, scan finger prints, scan iris, take body temperature and/or more. The database (or Registry 26) in combination with the kiosk device 110 can be used to identify non-compliant individuals, avoid liability or violations, grant access to the worksite to compliant and competent individuals, and/or decrease the risk of letting incompetent or non-compliant workers on a worksite. When an individual scans at the Safety Kiosk 110, a computer system will automatically check all Professional Documentation 16 in the database 26 and calculate or determine if this individual is fit to enter the worksite based on local, State and Federal regulations as well as based on specific safety requirement of the employer. Individuals who are found fit and/or compliant with all rules and regulations will be allowed to proceed. The interface in the computer tablet 122 of the Safety Kiosk 110 will display a message of authorized access. Individuals found to be unfit and/or non-compliant with any rule or regulation will be notified by the interface of the computer tablet 122 to exit the worksite or to remain in place until a competent or supervising person from the worksite can make further decisions or determinations. This competent or supervising person may receive an instant electronic message from the system notifying of this situation and/or inviting him/her to meet with the individual who wants to enter the worksite.

This process enables control access to a worksite solely based on individual competency and ability to do their work in the best and safest way possible regardless of their relationship with the worksite: subcontractor, transient worker, seasonal worker, and duration of site employment: 1 day to many years to undetermined. This is particularly relevant to industries such as Construction, Landscaping, Manufacturing, Mining and others where employment takes many forms and durations but where safety remains nevertheless paramount. The result of this process for the employer is to have a much better and instant or live understanding of all the individuals present at a worksite, their relevant Professional Documentation, ability to do their work safely and efficiently and avoid non-compliance violations or penalties from Local, State or Federal Government Administrations. The data collected by the Safety Kiosk may be mixed with other (publicly or not publicly available) data that will enable development of a deeper or predictive analysis of how unsafe or dangerous conditions emerge. More importantly, these unsafe conditions could be mitigated with further training, certification, or other education.

The Safety Kiosk 110 may also be used to scan optical codes associated with equipment, tools, or other instruments or devices at the worksite to identify their presence or departure from the same site. These equipment, tools, instruments or devices can also be scanned concurrently with individuals, to record who will be using which specific equipment, tool, instrument or device. Based on provided Professional Documentation 16, the system may calculate or determine if the individual is entitled, authorized, trained, or competent to use the specific equipment, tool, instrument, or device safely and also record its safe return and/or lock-out/tag-out. The Safety Kiosk 110, its components, software and/or interfaces may be integrated with additional physical barriers such as gates or turnstiles to further deter non-compliant individuals to enter the worksite.

As such, generally disclosed herein are embodiments for a system and method to secure training transaction using blockchain technology. The system and method include accessing a unique student profile for a student and accessing a unique trainer profile for a trainer. The system and method further include initiating an electronic delivery of a professional documentation via the trainer to send to the student, where the professional documentation includes a unique record of information to identify the student. The system and method also include accepting the electronic delivery of the professional documentation via the student.

Further generally disclosed herein are embodiments for a system and method to control the presence of one or more individuals at a worksite. The system and method include an identifying mechanism configured to receive identifying information that represents an individual and a processing system configured to determine whether the identified individual can enter the worksite by comparing professional documentation of the identified individual with safety requirements of the worksite and government regulations.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A blockchain-based system for securing worksite training transactions, the system comprising one or more processors configured to:
   access a unique student profile of a student;
   access a unique trainer profile of a trainer;
   initiate an electronic delivery of a professional documentation via the trainer to send to the student, the professional documentation comprising unique information to identify the student;
   accept the electronic delivery of the professional documentation via the student; and
   wherein each electronic delivery of professional documentation forms a new record, the new record being one record in a registry comprising a plurality of sequential records, the new record containing a cryptographic hash of a previous record such that the previous record cannot be altered retroactively without alteration of all subsequent records, the subsequent records including the new record.

2. The blockchain-based system of claim 1, wherein the one or more processors are further configured to register the unique student profile and the unique trainer profile.

3. The blockchain-based system of claim 1, wherein the unique student profile comprises information about at least one of professional training, licenses, and certifications held by the student.

4. The blockchain-based system of claim 1, wherein the unique trainer profile comprises information about at least one of professional training, licenses, and certifications authorized to provide to the student.

5. The blockchain-based system of claim 1, wherein the unique information comprises a trainer identifier, a student identifier, a type of training, a date and time of completion, and a delivery date.

6. The blockchain-based system of claim 1, wherein the unique information comprises a unique identifier associate with at least one of an encryption key and hash.

* * * * *